US009038369B2

(12) United States Patent
Khaled et al.

(10) Patent No.: US 9,038,369 B2
(45) Date of Patent: May 26, 2015

(54) SYSTEMS AND METHODS FOR AFTERTREATMENT SYSTEM DIAGNOSTICS

(71) Applicant: Cummins Inc., Columbus, IN (US)

(72) Inventors: Nassim Khaled, Columbus, IN (US); Richard A. Booth, Columbus, IN (US)

(73) Assignee: Cummins Inc., Columbus, IN (US)

( * ) Notice: Subject to any disclaimer, the term of this patent is extended or adjusted under 35 U.S.C. 154(b) by 67 days.

(21) Appl. No.: 13/766,253

(22) Filed: Feb. 13, 2013

(65) Prior Publication Data

US 2014/0223886 A1  Aug. 14, 2014

(51) Int. Cl.
*F01N 3/00* (2006.01)
*F01N 11/00* (2006.01)
*F01N 3/10* (2006.01)
*F01N 3/20* (2006.01)

(52) U.S. Cl.
CPC ............... *F01N 11/00* (2013.01); *F01N 3/106* (2013.01); *F01N 3/2066* (2013.01); *F01N 2550/02* (2013.01); *F01N 2560/026* (2013.01); *F01N 2560/14* (2013.01); *Y02T 10/47* (2013.01); *Y02T 10/24* (2013.01)

(58) Field of Classification Search
CPC ............. F01N 11/00; F01N 2013/026; F01N 2560/026; F01N 2560/14; F01N 2550/02; Y02T 10/47; F02B 37/00
USPC .................................... 60/272–324
See application file for complete search history.

(56) References Cited

U.S. PATENT DOCUMENTS

| 5,545,377 | A | 8/1996 | Fukaya et al. |
| 6,901,742 | B1 | 6/2005 | Lang et al. |
| 6,925,796 | B2 | 8/2005 | Nieuwstadt et al. |
| 7,134,273 | B2 | 11/2006 | Mazur et al. |
| 7,198,952 | B2 | 4/2007 | Uchida et al. |
| 7,294,252 | B2 | 11/2007 | Wang et al. |
| 7,624,628 | B2 * | 12/2009 | Bartley ...................... 73/114.75 |
| 2004/0098980 | A1 * | 5/2004 | Montreuil et al. .............. 60/295 |
| 2009/0158719 | A1 * | 6/2009 | Hallstrom et al. .............. 60/297 |
| 2010/0043397 | A1 * | 2/2010 | Wang et al. ..................... 60/273 |
| 2011/0079001 | A1 * | 4/2011 | Sakurai et al. .................. 60/295 |
| 2011/0146239 | A1 * | 6/2011 | Handler et al. ................. 60/274 |
| 2012/0275977 | A1 * | 11/2012 | Chandler et al. ........... 423/213.5 |

FOREIGN PATENT DOCUMENTS

| EP | 1 580 412 B1 | 4/2008 |
| WO | WO 01/06223 A1 | 1/2001 |

* cited by examiner

*Primary Examiner* — Jesse Bogue
(74) *Attorney, Agent, or Firm* — Krieg DeVault LLP

(57) ABSTRACT

Methods and systems for diagnosing inadequate performance and/or degradation of one or more components of an aftertreatment system are disclosed, the components including at least an oxidation catalyst that is positioned upstream from an SCR catalyst. A performance degradation analysis of the oxidation catalyst is based on a comparison of measurements received from a first nitrous oxide (NOx) sensor located upstream of the oxidation catalyst and a second NOx sensor located downstream from the oxidation catalyst.

17 Claims, 5 Drawing Sheets

SYSTEMS AND METHODS FOR AFTERTREATMENT SYSTEM DIAGNOSTICS

BACKGROUND

The present application relates to systems and methods for diagnosing aftertreatment component degradation in an exhaust gas aftertreatment system, and more particularly, but not exclusively, to methods and systems for diagnosing degradation of a catalysts that generate feedgas to a selective catalytic reduction (SCR) catalyst.

Control and monitoring of (SCR) catalyst performance are of increasing interest to meet modern internal combustion engine emissions standards. The efficiency of a typical SCR catalyst in removing NOx emissions is sensitive to the molar ratio of $NO_2$ to NOx at the inlet to the SCR catalyst. Under most conditions for diesel engine operation, the ratio of $NO_2$ to NOx at the SCR inlet is established by the operational capability of the upstream diesel oxidation catalyst (DOC) and diesel particulate filter (DPF) since these components tend to make $NO_2$ from NO upstream of the SCR catalyst inlet. However, as these components age, this ability to convert NO to $NO_2$ deteriorates, and the molar ratio of $NO_2$ to NOx at the inlet to the SCR catalyst drops. Thus, the efficiency of the SCR catalyst is reduced over time.

Diagnostic systems are typically located within a vehicle and are used to monitor operation of various systems of a vehicle. Consequently, it would be desirable to employ these diagnostic systems in monitoring the performance and/or degradation of aftertreatment components to avoid increased emissions that might occur if such events remained undetected while the vehicle continued to be operated. Accordingly, further technological developments in this area are desirable.

SUMMARY

Embodiments of the present application are directed to methods and systems for diagnosing inadequate performance of one or more components of an aftertreatment system. The systems and methods disclosed herein monitor and/or diagnose the capability of one or more upstream catalysts to generate desired feedgas constituents for one or more downstream SCR catalysts and communicate inadequate performance of the upstream catalysts to the vehicle operator, service technician, and/or others. In one embodiment, the aftertreatment system includes an oxidation catalyst that is positioned upstream from an SCR catalyst. The methods and systems include providing an indication of degradation of the oxidation catalyst performance based on a comparison of measurements received from a first nitrous oxide (NOx) sensor located upstream of the oxidation catalyst and a second NOx sensor located downstream from the oxidation catalyst and upstream of the SCR catalyst. Various embodiments include methods and systems for processing the measurements to provide an indication of oxidation catalyst degradation and/or health. Further embodiments, forms, objects, aspects, benefits, features, and advantages of the present invention shall become apparent from the figures and description provided herewith.

DETAILED DESCRIPTION OF REPRESENTATIVE EMBODIMENTS

Figure 1:
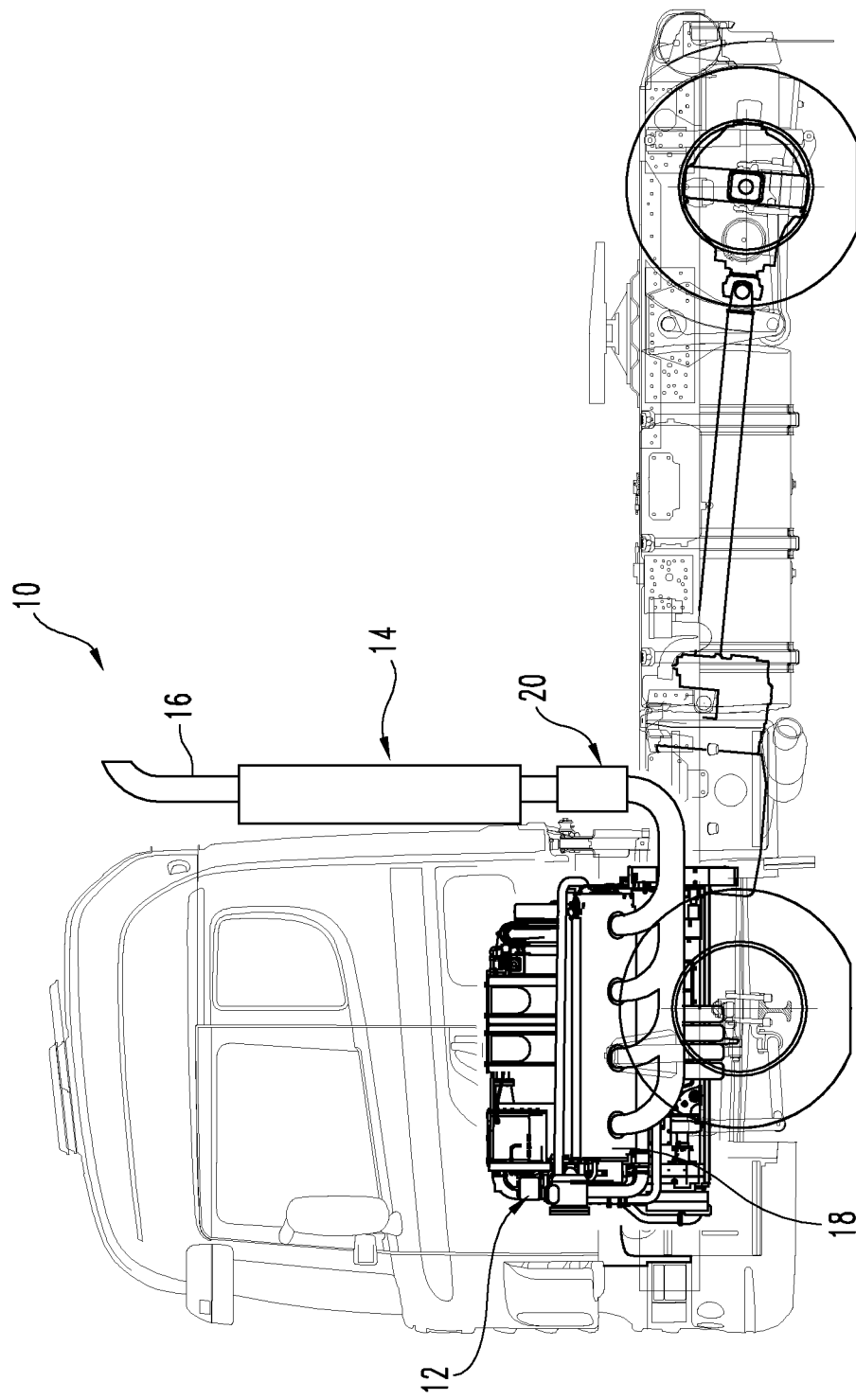
FIG. 1 is a diagrammatic view of a vehicle with an engine and an exhaust system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates.

FIG. 1 is a diagrammatic view of vehicle 10 including an internal combustion engine 12 coupled to an exhaust system 14. Although the vehicle 10 is illustrated as a semi-tractor, the vehicle 10 could alternatively be any of a variety of other vehicle types such as a light-, medium- or heavy-duty truck, bus, car, SUV, motor coach, or different variety of land traveling vehicle. In other embodiments, the vehicle 10 may be of a marine or aircraft type. In still other embodiments, engine 12 and exhaust system 14 are part of a stationary application, such as a generator set.

Generally, the internal combustion engine 12 operates to combust a mixture of fuel (e.g., gasoline, diesel, or the like or a combination thereof) and induction gas (e.g., fresh air, recirculated exhaust gas, or the like or a combination thereof) within a plurality of combustion chambers. The temperature and pressure of the exhaust gas generated upon combustion applies some force to a component of the engine 12 (e.g., a piston, a turbine blade, or the like) which is then translated into mechanical energy. Thereafter, the exhaust gas is removed from the engine 12 and conveyed to the ambient environment by way of exhaust system 14 that includes an exhaust passage 16 coupled to, for example, an exhaust manifold 18 of the engine 12.

The exhaust system 14 includes an exhaust aftertreatment system 20 disposed within the exhaust passage 16, which is configured to reduce emissions from the exhaust gas that would otherwise be released to the ambient environment. Examples of emissions within the exhaust gas include carbon monoxide (CO), hydrocarbons (HC), nitrogen oxides such as nitrous oxide (NO) and nitrogen dioxide ($NO_2$), particulate matter (PM), and the like, or a combination thereof. Collectively, oxides of nitrogen such as NO and $NO_2$ are referred to herein as NOx. As will be described in greater detail below, aftertreatment system 20 includes a diagnostic system configured to determine when an oxidation catalyst of the exhaust aftertreatment system 20 is not operating in a desired manner for effective reduction of NOx emissions.

Figure 2:
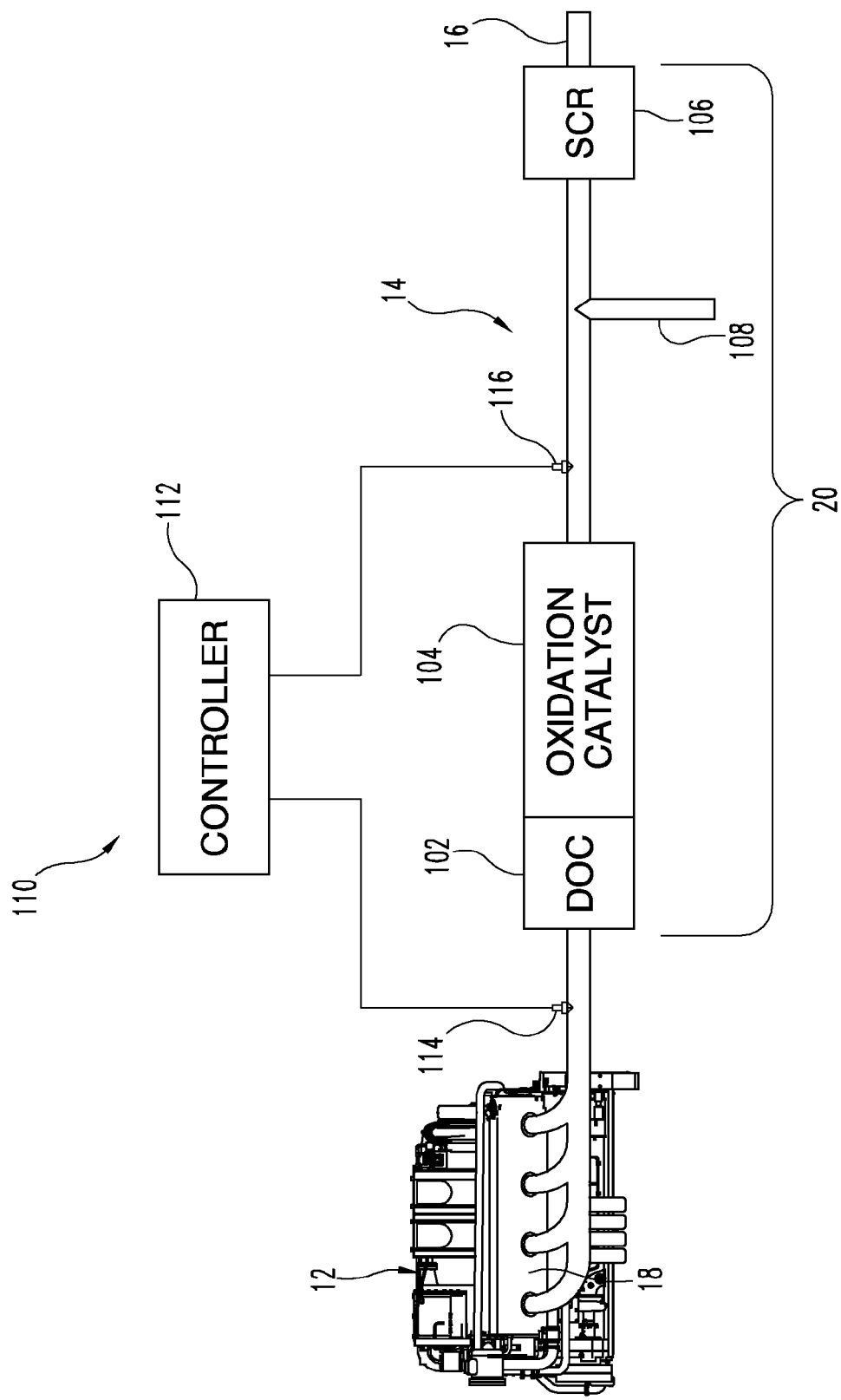
FIG. 2 is a schematic view of one embodiment of a diagnostic system coupled to the exhaust system shown in FIG. 1, including NOx sensors upstream and downstream of the oxidation catalyst.

Referring to FIG. 2, the exhaust aftertreatment system 20 includes an oxidation catalyst 102, a particulate filter 104, and a selective catalytic reduction (SCR) catalyst 106 disposed within the exhaust system 14 to receive a flow of exhaust gas generated by the engine 12. The oxidation catalyst 102 is disposed within the exhaust passage 16 at a location upstream of the SCR catalyst 106. The exhaust aftertreatment system 20 also includes a doser 108 operationally connected to a supply of reducing agent (not shown), such as urea or ammonia. The doser 108 has a nozzle disposed within the exhaust passage 16 so as to inject the reducing agent into the exhaust gas flow upstream of the SCR catalyst 106 and downstream of the oxidation catalyst 102. In an alternative embodiment, the doser 108 may include a second nozzle, or a single nozzle, located upstream of the oxidation catalyst 102. The system 20 may include an ammonia oxidation catalyst (AMOX) (not shown) downstream of the SCR catalyst 106. In certain embodiments, the AMOX may not be present, or the AMOX may be commingled with the SCR catalyst 106 (or the last SCR catalyst, where multiple SCR catalysts are present), for example with a washcoat applied toward the rear portion of the SCR catalyst 106 that is responsive to at least partially oxidize ammonia.

The oxidation catalyst 102 is configured to convert a portion of incoming NO in the exhaust gas flow to $NO_2$ by oxidation, thereby increasing the NO2/NOx ratio and decreasing the NO/NOx ratio of the exiting exhaust gas stream to improve performance of SCR catalyst 106. The oxidation catalyst 102 can be provided as any suitable oxidation catalyst. Examples of suitable oxidation catalysts include non-methane hydrocarbon (NMHC) catalysts, diesel oxidation catalysts, catalyzed exhaust gas particulate filters, or the like or a combination thereof. In certain further embodiments, the aftertreatment system 20 includes a diesel oxidation catalyst (DOC) 102 and a diesel particulate filter (DPF) 104 forming a DOC/DPF system positioned upstream of SCR catalyst 106. In other embodiments, any of these components may be present or missing, catalyzed or not catalyzed, and may be arranged in alternate order. Further, certain components or all components may be provided in the same or separate housings.

The SCR catalyst 106 can be provided as any suitable SCR catalyst. In one embodiment, SCR catalyst 106 may be an Active Lean NOx (ALNC) catalyst, and the reductant may be hydrocarbon. In another alternative, the SCR catalyst 106 may be a Lean NOx Trap (LNT). Generally, a kinetically favored SCR reaction requires the presence of NO and $NO_2$ in equimolar ratio since the SCR catalyst 106 is configured to convert the incoming NOx within the exhaust gas to $N_2$ and $H_2O$. The SCR catalyst 106 operates more efficiently when the NOx composition in the exhaust gas passed by the oxidation catalyst 102 to the inlet of SCR catalyst 106 has a sufficiently high concentration of $NO_2$ (i.e., a sufficiently high $NO_2$ level) as compared to the level of NOx in the exhaust gas. Certain aftertreatment components, such as the DOC/DPF 102/104, make $NO_2$ from NO. However, as these aftertreatment components age, they have reduced capability to convert NO to $NO_2$, which decreases the $NO_2$ to $NO_x$ ratio at the inlet to the SCR catalyst 106 and adversely impacts the ability of the SCR catalyst 106 to remove $NO_x$ from exhaust emissions. Therefore, the methods and systems disclosed herein are capable of diagnosing the inability of oxidation catalyst 102 to produce sufficient additional $NO_2$ at the outlet of the DOC/DPF system 102/104 and provide the desired $NO_2$ to $NO_x$ ratio at the inlet of SCR catalyst 106.

In one embodiment, a diagnostic system 110 is provided to determine whether the oxidation catalyst 102 is functioning in a desired manner for efficient operation of SCR catalyst 106 in removing NOx. The diagnostic system 110 includes a controller 112 coupled to a first NOx sensor 114 disposed in operable communication with exhaust passage 16 upstream of oxidation catalyst 102. Controller 112 is further coupled to a second NOx sensor 116 disposed in operable communication with exhaust passage 16 between oxidation catalyst 102 and SCR catalyst 106.

In one embodiment, the first sensor 114 and the second sensor 116 may each be provided as a NOx sensor configured to detect a NOx composition in the exhaust gas conveyed by the exhaust passage 16 and generate a sensor signal corresponding to the amount of NOx in the exhaust gas. Therefore, the first sensor 114 is configured to generate a first sensor signal corresponding to the detected NOx amount at a location upstream of the oxidation catalyst 102 and the second sensor 116 is configured to generate a second sensor signal corresponding to the detected NOx amount at a location downstream of the oxidation catalyst 102. Sensor signals generated by the first and second sensors 114 and 116 can be transmitted to the controller 112 over any suitable wired or wireless transmission medium.

In addition, sensors can be provided that measure or detect aging conditions of one or more components of the aftertreatment system, such as the cumulative hours of DPF regeneration, accumulated temperature time data, miles, and hours of operation. Other sensors can be provided to measure or determine the mass flow through the exhaust system, the temperature of any component of the aftertreatment system 20 or of the exhaust gas, the amount of ammonia stored in the SCR catalyst 106, etc. The illustrated sensors are exemplary only, and other sensors may be present that are not illustrated in FIG. 2. Further, certain sensors may instead be virtual sensors that are calculated from other parameters available to the system, or values that would be indicated by sensors may instead be supplied to a computer readable memory location, via a datalink or network communication, or otherwise be made available to the system where the sensor providing the sensed parameter is not a part of the defined system.

The first sensor 114 and the second sensor 116 can be sensitive to the amounts of NO and $NO_2$ constituting the NOx amount. For example, the first sensor 114 and the second sensor 116 each have a sensitivity to NO that is different from a sensitivity to $NO_2$. In one embodiment, the first sensor 114 and the second sensor 116 are more sensitive to NO than to $NO_2$, and the sensitivity of the first sensor 114 to $NO_2$ is at least substantially the same as the sensitivity of the second sensor 116 to $NO_2$. In a particular embodiment, sensors 114, 116 are selected to be less sensitive to $NO_2$ than to NO so that the operational signatures of sensors 114, 116 are increased due to less sensitivity in the fluctuations of $NO_2$ levels in the exhaust.

In one embodiment, the methods and systems disclosed herein determine a ratio of the difference in the NOx amounts detected by sensors 114, 116 divided by the NOx amount detected by sensor 114, and compare the ratio to a threshold amount that corresponds to a minimum desired ratio of $NO_2$ to NOx in the exhaust gas between the oxidation catalyst 102 and SCR catalyst 106. If the ratio is less than the threshold amount, an indication that oxidation catalyst 102 is ineffective in converting NO to $NO_2$ to support efficient operation of SCR catalyst 106 is provided by, for example, illuminating an indicator light or providing other suitable output on an on-board diagnostic system of vehicle 10.

Figure 3:
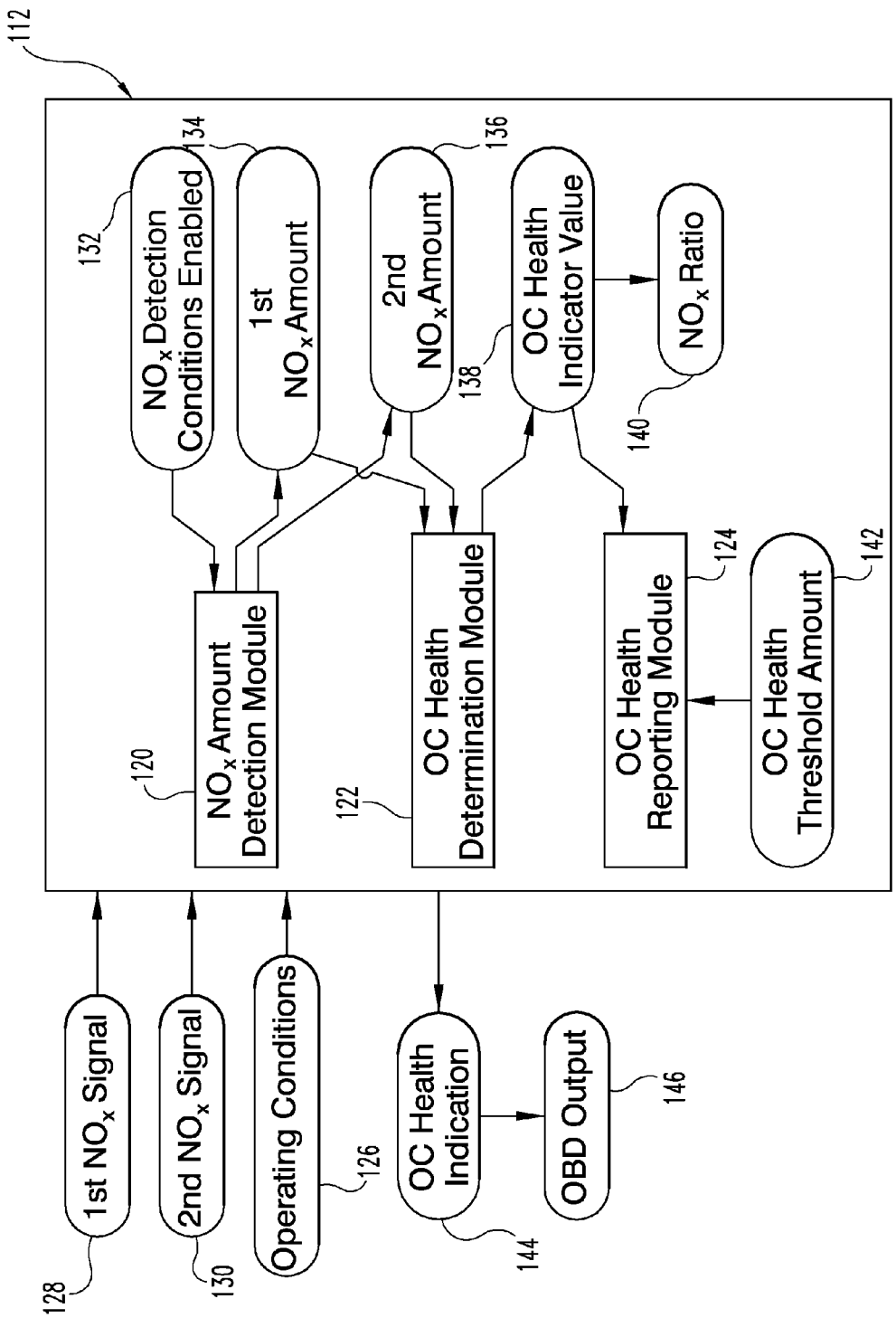
FIG. 3 is a schematic view of one embodiment of the controller shown in FIG. 2.

As shown further in FIG. 3, controller 112 includes a number of modules structured to functionally execute operations for diagnosing a poorly or improperly performing oxidation catalyst 102 based on the output of sensors 114, 116. In certain embodiments, the controller 112 forms a portion of a processing subsystem including one or more computing devices having memory, processing, and communication hardware. The controller 112 may be a single device or a distributed device, and the functions of the controller 112 may be performed by hardware or software. The controller 112 may be in communication with any sensor, actuator, datalink, and/or network in the system.

In certain embodiments, the controller 112 includes an NOx amount detection module 120, an oxidation catalyst (OC) health determination module 122, and an OC health reporting module 124. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included with specific reference to FIG. 3.

The NOx amount detection module 120 of controller 112 receives signals corresponding to one or more operating conditions 126 that provide information regarding operation of engine 12 and/or exhaust system 14. The operating conditions 126 may include, but are not limited to, a temperature of engine 12, a speed of engine 12, a temperature of the exhaust gas, a flow rate of exhaust gas, a reductant amount being dosed or reductant dosing being disabled, a temperature of particulate filter 104, a temperature of oxidation catalyst 102, a temperature of SCR catalyst 106, a regeneration status and/or soot loading of particulate filter 104, etc. For example, one set of operating conditions 126 in which NOx detection by sensors 114, 116 is enabled may include the exhaust gas temperature being in a range that does not favor particulate filter regeneration as indicated by a temperature sensor in exhaust system 14, and particulate filter 104 having a low soot loading condition as indicated by a measurement of a pressure drop across particulate filter 104. However, any one or combination of suitable operating criteria which enable the NOx detection conditions 132 are contemplated.

When NOx operating conditions are enabled as determined by operation 132 of controller 112, NOx amount detection module 120 receives first NOx signal 128 and second NOx signal 130 detected by first sensor 114 and second sensor 116, respectively. The first NOx signal 128 and second NOx signal 130 are processed or otherwise interpreted to indicate a first NOx amount 134 upstream of oxidation catalyst 102 and a second NOx amount 136 downstream of oxidation catalyst 102.

Figure 4:
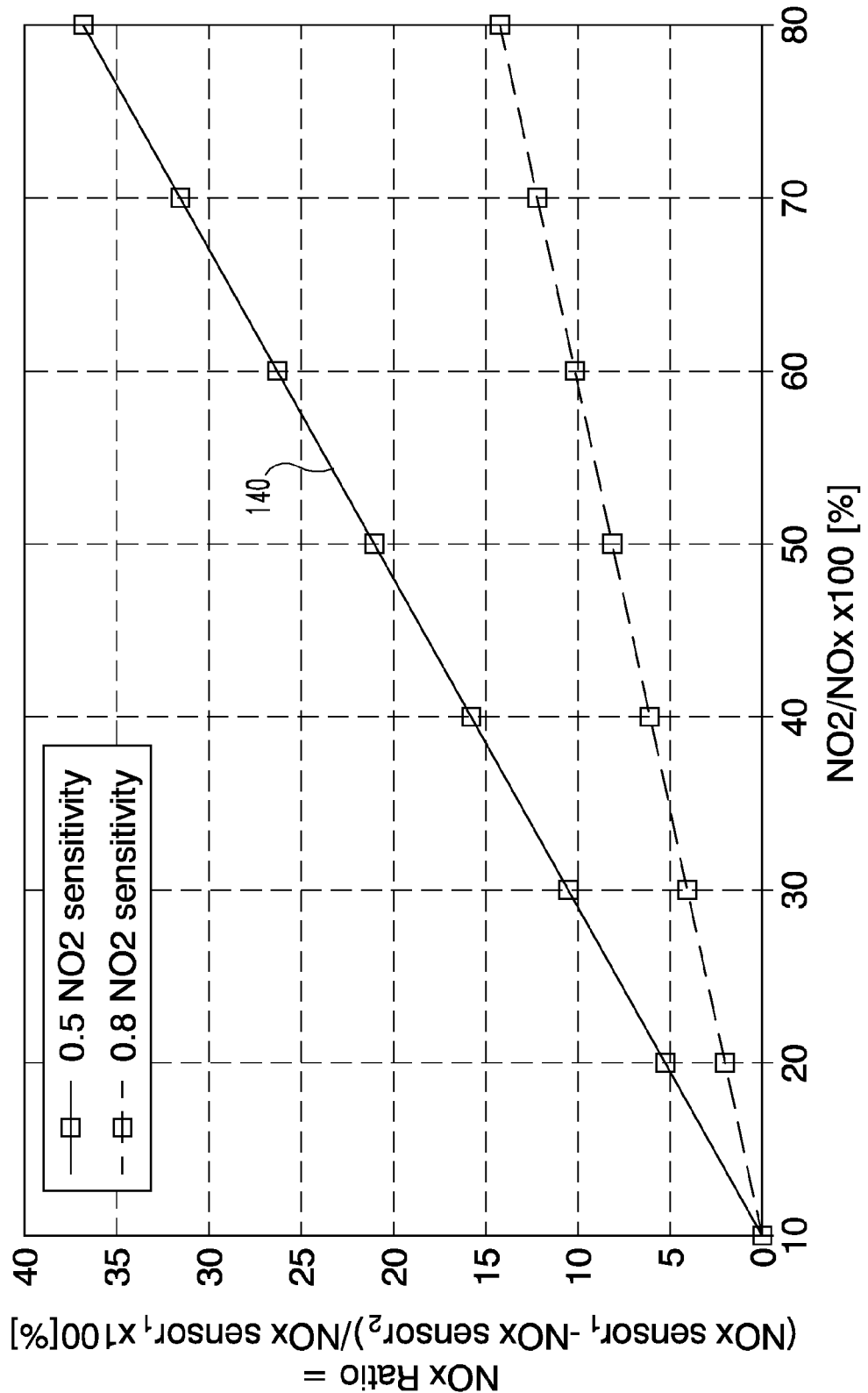
FIG. 4 is a graph showing the NO2/NOx ratio at the SCR inlet for various NOx ratios generated across the oxidation catalyst by two types of NOx sensors that have different sensitivity to $NO_2$.

Oxidation catalyst health determination module 122 is configured to receive first NOx amount 134 and second NOx amount 136 and determine an oxidation catalyst health indicator value 138. Oxidation catalyst health indicator value 138 provides a quantitative indication of the ability of oxidation catalyst 102 to convert NO to $NO_2$ to support efficient operation of SCR catalyst 106. In one embodiment, the quantitative indication includes an NOx ratio 140. As shown in FIG. 4, NOx ratio 140 is calculated by determining the difference between first NOx amount 134 and second NOx amount 136, and dividing the difference by first NOx amount 134. For example, if oxidation catalyst 102 completely lacks the ability to convert NO to $NO_2$, NOx ratio 140 is determined to be 0 because the NOx amounts 134, 136 are the same. Since NOx sensor 114, 116 has a sensitivity that is different for NO than NO2, a difference between the first and second NOx amounts 134, 136 indicated by NOx signals 128, 130 can be attributed to the ability of the oxidation catalyst 102 to convert NO to $NO_2$. Thus, NOx ratio 140 provides a quantitative indication of the ability of oxidation catalyst 102 to convert NO to $NO_2$.

As discussed above, NOx sensors 114, 116 have a sensitivity to $NO_2$ amounts in the exhaust gas in which the NOx measurement is taken. FIG. 4 shows a plot of NOx ratio 140 for an NOx sensor having a 0.5 $NO_2$ sensitivity and for an NOx sensor having a 0.8 $NO_2$ sensitivity. The NOx sensor that is less sensitive to $NO_2$ (as indicated by the 0.5 $NO_2$ sensitivity) provides a greater operational signature against which to evaluate NOx ratio 140 due to the steeper slope of the NOx ratio 140 versus the associated $NO_2$/NOx ratio at the inlet to SCR catalyst 106. As a result, using NOx sensors 114, 116 that are less sensitive to $NO_2$ provides a more robust determination of NOx ratio 140 and increases the capability of detecting failure of oxidation catalyst 102.

Figure 5:
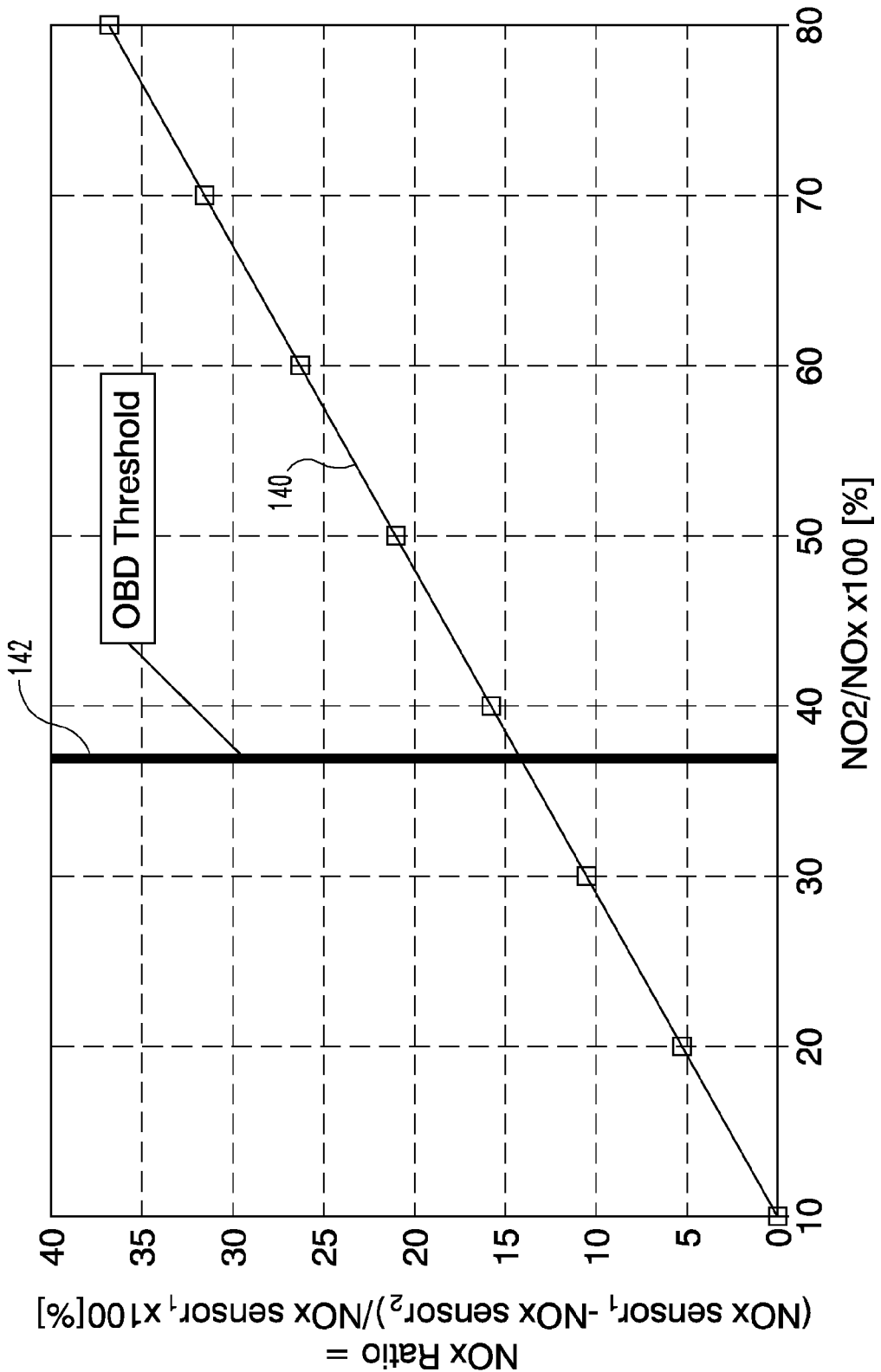
FIG. 5 is the graph of FIG. 4 showing only the NOx sensors that are less sensitive to $NO_2$ and an on-board diagnostic threshold indicating the NOx ratio associated with oxidation catalyst degradation.

Referring further to FIG. 5, oxidation catalyst health reporting module 124 receives the oxidation health indicator value 138 and compares the same to an oxidation catalyst threshold amount 142. The oxidation catalyst threshold amount 142 is established by an $NO_2$/NOx ratio at the inlet to SCR catalyst 106 in which the ability of SCR catalyst 106 to convert NOx is not sufficiently effective. The oxidation catalyst threshold amount 142 can correspond to, for example, an $NO_2$/NOx ratio in the range from about 30%-40%, although other $NO_2$/NOx ratios less than 50% are contemplated for threshold amount 142. The threshold amount 142 can be a pre-set amount programmed in controller 112, or determined by controller 112 based on operating conditions and/or other inputs. Accordingly, in the illustrated embodiment of FIG. 5 with NOx sensors 114, 116 having 0.5 $NO_2$ sensitivity, if an NOx ratio 140 is determined that is less than about 14-15%, oxidation catalyst health reporting module 124 provides an oxidation catalyst health indication 144 that oxidation catalyst 102 is degraded or in poor health and in need of service or replacement. In one embodiment, the oxidation catalyst health indication 144 is provided as an on-board diagnostic device output 146, such as by illuminating a display light or otherwise providing a suitable message or indication of the same to the operator or service personnel. In another example, output device 146 is a data link connector that is connectable to a computer or other service tool.

The descriptions herein provide illustrative embodiments of performing procedures for diagnosing oxidation catalyst failure in an SCR aftertreatment system. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

As is evident from the figures and text presented above, a variety of aspects related to the disclosure herein are contemplated.

According to one aspect, a method for aftertreatment system diagnostics comprises: detecting a first signal indicative of a first NOx amount within the exhaust stream at a first position that is upstream of an oxidation catalyst; detecting a second signal indicative of a second NOx amount within the exhaust stream at a second position that is downstream of the oxidation catalyst and upstream of an SCR catalyst; determining a health indicator value of the upstream oxidation catalyst based at least in part on a difference between the first and second NOx amounts; comparing the health indicator value to a threshold amount; and providing an indication of oxidation catalyst degradation when the health indicator value is less than the threshold amount.

According to another aspect, an apparatus includes an exhaust aftertreatment system including an oxidation catalyst and an SCR catalyst downstream of the oxidation catalyst. The apparatus also includes a first NOx sensor upstream of the oxidation catalyst and a second NOx sensor downstream of the oxidation catalyst and upstream of the SCR catalyst. The apparatus further includes a programmable controller in communication with the first and second NOx sensors. The controller includes an NOx amount detection module configured to determine a first NOx amount from the first NOx sensor and a second NOx amount from the second NOx sensor. The controller also includes an oxidation catalyst health determination module configured to determine a health indicator value of the oxidation catalyst based at least in part on a difference between the first and second NOx amounts. The controller further includes an oxidation catalyst health reporting module configured to provide an indication of oxidation catalyst health degradation when the health indicator value is less than a threshold amount.

According to yet another aspect, a system is disclosed that includes an internal combustion engine structured to provide an exhaust stream containing NOx to an aftertreatment system. The system includes an oxidation catalyst in the aftertreatment system that is structured to oxidize an amount of NOx in the exhaust stream and an SCR catalyst downstream of the oxidation catalyst structured to receive the oxidized exhaust stream from the oxidation catalyst. The system further includes a first sensor operatively coupled to the exhaust stream at a first position upstream of the oxidation catalyst and a second sensor operatively coupled to the exhaust stream at a second position downstream of the oxidation catalyst and upstream of the SCR catalyst. The first sensor is structured to detect an NOx amount in the exhaust stream at the first position and the second sensor is structured to detect an NOx amount in the exhaust stream at the second position. The system also includes a controller in communication with the first and second sensors. The controller is configured to determine a health indicator value of the oxidation catalyst in response to the NOx amounts detected at the first and second positions.

Various embodiments of the aspects are also contemplated. For example, determining the health indicator value can include determining a ratio that is the difference between first NOx amount and the second NOx amount divided by the first NOx amount. In another example, the threshold amount corresponds to a predetermined ratio of $NO_2$ to NOx at an inlet to the SCR catalyst. In a refinement of this example, the predetermined ratio is in the range from about 30% to about 40%. In yet another example, the first and second NOx sensors have the same sensitivity to $NO_2$, and are less sensitive to $NO_2$ than to NO.

In another example, providing the indication of oxidation catalyst degradation includes outputting the indication of oxidation catalyst degradation to an output device. In one refinement of this example, the output device is an on-board diagnostic system of a vehicle. In a further refinement the output device is a malfunction indicator light of the on-board diagnostic system. In another refinement, the output device comprises a data link connector.

In an additional example, the oxidation catalyst includes a non-methane hydrocarbon catalyst. In another example, each of the first and second sensors has a differential sensitivity to NO and $NO_2$, and each of the first and second sensors is more sensitive to NO than to $NO_2$. In yet another example, a particulate filter in the aftertreatment system is downstream of the first sensor and upstream of the second sensor.

Any theory, mechanism of operation, proof, or finding stated herein is meant to further enhance understanding of embodiments of the present invention and is not intended to make the present invention in any way dependent upon such theory, mechanism of operation, proof, or finding. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method for aftertreatment system diagnostics, comprising:
    producing an exhaust stream with an internal combustion engine;
    detecting a first signal indicative of a first NOx amount within an exhaust stream with a first NOx sensor at a first position that is upstream of an oxidation catalyst;
    passing the exhaust stream through the oxidation catalyst;
    detecting a second signal indicative of a second NOx amount within the exhaust stream with a second NOx sensor at a second position that is downstream of the oxidation catalyst and upstream of an SCR catalyst;
    determining a health indicator value of the oxidation catalyst based at least in part on a difference between the first and second NOx amounts, wherein determining the health indicator value comprises determining a ratio that is the difference between first NOx amount and the second NOx amount divided by the first NOx amount;
    comparing the health indicator value to a threshold ratio; and
    providing an indication of oxidation catalyst degradation when the health indicator value is less than the threshold ratio, wherein the threshold ratio is based on a sensitivity of the first and second NOx sensors to $NO_2$ in the NOx amount, wherein the threshold ratio is 15%.

2. The method of claim 1, wherein the threshold ratio corresponds to a predetermined ratio of $NO_2$ to NOx at an inlet to the SCR catalyst.

3. The method of claim 2, wherein the predetermined ratio is less than 50%.

4. The method of claim 1, wherein providing the indication of oxidation catalyst degradation includes outputting the indication of oxidation catalyst degradation to an on-board diagnostic system of a vehicle.

5. An apparatus, comprising:
    an exhaust aftertreatment system including an oxidation catalyst and an SCR catalyst downstream of the oxidation catalyst;
    a first NOx sensor upstream of the oxidation catalyst;
    a second NOx sensor downstream of the oxidation catalyst and upstream of the SCR catalyst;

a programmable controller in communication with the first and second NOx sensors, the controller including:

an NOx amount detection module configured to determine a first NOx amount from the first NOx sensor and a second NOx amount from the second NOx sensor;

an oxidation catalyst health determination module configured to determine a health indicator value of the oxidation catalyst based at least in part on a difference between the first and second NOx amounts, wherein the oxidation catalyst health determination module is configured to determine the health indicator value as a ratio comprising the difference between first NOx amount and the second NOx amount divided by the first NOx amount; and an oxidation catalyst health reporting module configured to provide an indication of oxidation catalyst health degradation when the health indicator value is less than a threshold ratio, wherein the threshold ratio is based on a sensitivity of the first and second NOx sensors to $NO_2$ in the NOx amount, wherein the threshold ratio is 15%, wherein each of the NOx amount detection module, the oxidation catalyst health determination module, and the oxidation catalyst health reporting module is implemented in at least one of hardware and a non-transitory computer readable medium.

6. The apparatus of claim 5, wherein the oxidation catalyst health reporting module is configured to provide the indication of oxidation catalyst health indication to an output device.

7. The apparatus of claim 5, wherein the output device comprises an on-board diagnostic system of a vehicle.

8. The apparatus of claim 7, wherein the output device comprises a malfunction indicator light of the on-board diagnostic system.

9. The apparatus of claim 5, wherein the output device comprises a data link connector.

10. The apparatus of claim 5, wherein:
the first and second NOx sensors have the same sensitivity to $NO_2$; and
each of the first and second NOx sensors is more sensitive to NO than to $NO_2$.

11. The apparatus of claim 5, wherein the threshold ratio amount corresponds to a predetermined ratio of $NO_2$ to NOx at an inlet to the SCR catalyst.

12. The apparatus of claim 11, wherein the predetermined ratio is less than 50%.

13. A system, comprising:
an internal combustion engine structured to provide an exhaust stream containing NOx to an aftertreatment system;
an oxidation catalyst in the aftertreatment system that is structured to oxidize an amount of NOx in the exhaust stream;
an SCR catalyst downstream of the oxidation catalyst structured to receive the oxidized exhaust stream from the oxidation catalyst;
a first sensor operatively coupled to the exhaust stream at a first position upstream of the oxidation catalyst, the first sensor structured to detect an NOx amount in the exhaust stream at the first position;
a second sensor operatively coupled to the exhaust stream at a second position downstream of the oxidation catalyst and upstream of the SCR catalyst, the second sensor structured to detect an NOx amount in the exhaust stream at the second position; and
a controller in communication with the first and second sensors, the controller configured to determine a health indicator value of the oxidation catalyst as a ratio comprising the difference between the NOx amount at the first position and the NOx amount at the second position divided by the NOx amount at the first position, wherein the controller is configured to output an indication of oxidation catalyst health degradation when the health indicator value is less than a threshold ratio, wherein the threshold ratio is based on a sensitivity of the first and second sensors to $NO_2$ in the NOx amount, wherein the threshold ratio is 15%.

14. The system of claim 13, wherein the oxidation catalyst is a non-methane hydrocarbon catalyst.

15. The system of claim 13, wherein:
each of the first and second sensors has a differential sensitivity to NO and $NO_2$; and
each of the first and second sensors is more sensitive to NO than to $NO_2$.

16. The system of claim 13, further comprising a particulate filter in the aftertreatment system downstream of the first sensor and upstream of the second sensor.

17. The system of claim 13, wherein the threshold ratio corresponds to a predetermined ratio of $NO_2$ to NOx at an inlet of the SCR catalyst.

* * * * *